United States Patent
Binning

(10) Patent No.: US 7,551,726 B2
(45) Date of Patent: Jun. 23, 2009

(54) SYSTEMS AND METHODS FOR PROVIDING LOCATION SIGNALS/INDICATORS WHEN 911 DIALED

(75) Inventor: Valerie Binning, Cumming, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 429 days.

(21) Appl. No.: 11/447,635

(22) Filed: Jun. 6, 2006

(65) Prior Publication Data
US 2006/0227942 A1  Oct. 12, 2006

Related U.S. Application Data

(63) Continuation of application No. 10/768,800, filed on Jan. 30, 2004, now Pat. No. 7,068,760.

(51) Int. Cl.
H04M 11/04 (2006.01)

(52) U.S. Cl. ................. 379/45; 455/550.1

(58) Field of Classification Search ........... 379/45; 455/550.1, 404.2, 456.1–456.5, 404; 709/224; 701/117
See application file for complete search history.

(56) References Cited

U.S. PATENT DOCUMENTS

| | | |
|---|---|---|
| 4,935,951 A | 6/1990 | Robinson et al. |
| 4,993,058 A | 2/1991 | McMinn et al. |
| 5,012,507 A | 4/1991 | Leighton et al. |
| 5,161,180 A | 11/1992 | Chavous |
| RE34,677 E | 7/1994 | Ray et al. |
| 5,379,337 A * | 1/1995 | Castillo et al. ........ 379/45 |
| 5,511,111 A | 4/1996 | Serbetcioglu et al. |
| 5,526,406 A | 6/1996 | Luneau |
| 5,621,379 A | 4/1997 | Collins |
| 5,673,304 A | 9/1997 | Connor et al. |
| 5,724,412 A | 3/1998 | Srinivasan |
| 5,796,806 A | 8/1998 | Birckbichler |
| 5,805,587 A | 9/1998 | Norris et al. |
| 5,883,942 A | 3/1999 | Lim et al. |
| 5,940,474 A | 8/1999 | Ruus |
| 5,940,475 A | 8/1999 | Hansen |
| 6,009,148 A | 12/1999 | Reeves |
| 6,011,473 A | 1/2000 | Klein |
| 6,104,800 A | 8/2000 | Benson |
| 6,144,644 A | 11/2000 | Bajzath et al. |
| 6,208,718 B1 | 3/2001 | Rosenthal |
| 6,208,726 B1 | 3/2001 | Bansal et al. |

(Continued)

OTHER PUBLICATIONS

U.S. Appl. No. 11/318,110, filed Dec. 2005.

(Continued)

Primary Examiner—Curtis Kuntz
Assistant Examiner—Maria El-Zoobi
(74) Attorney, Agent, or Firm—Scott P. Zimmerman, PLLC

(57) ABSTRACT

Methods, systems, and apparatuses that operate with different communications devices, different users, and/or different communications networks to generate, enable, and/or transmit an Emergency Locator Signal to a communications address of the local communications network. According to embodiments, the transmitted Emergency Locator Signal communicates with the local communications network to identify a location of the calling party's communications device (or alternate selected communications device) at a geographic location of an Emergency Communications Address. Thereafter, the location of the calling party's communications device is communicated to emergency response personnel to better locate a victim in proximity to the calling party's communications device.

20 Claims, 8 Drawing Sheets

U.S. PATENT DOCUMENTS

| | | |
|---|---|---|
| 6,219,413 B1 | 4/2001 | Burg |
| 6,259,692 B1 | 7/2001 | Shtivelman |
| 6,307,920 B1 * | 10/2001 | Thomson et al. ............... 379/45 |
| 6,310,946 B1 | 10/2001 | Bauer et al. |
| 6,343,115 B1 | 1/2002 | Foldare et al. |
| 6,347,136 B1 | 2/2002 | Horan |
| 6,356,756 B1 | 3/2002 | Koster |
| 6,434,126 B1 | 8/2002 | Park |
| 6,476,763 B2 * | 11/2002 | Allen, Jr. ................. 342/357.1 |
| 6,529,500 B1 | 3/2003 | Pandharipande |
| 6,603,977 B1 | 8/2003 | Walsh et al. |
| 6,608,886 B1 | 8/2003 | Contractor |
| 6,622,016 B1 | 9/2003 | Sladek et al. |
| 6,624,754 B1 | 9/2003 | Hoffman et al. |
| 6,661,785 B1 | 12/2003 | Shang et al. |
| 6,665,388 B2 | 12/2003 | Bedingfield |
| 6,665,611 B1 | 12/2003 | Oran et al. |
| 6,674,745 B1 | 1/2004 | Schuster et al. |
| 6,678,357 B2 | 1/2004 | Stumer et al. |
| 6,680,998 B1 | 1/2004 | Bell et al. |
| 6,703,930 B2 | 3/2004 | Skinner |
| 6,718,021 B2 | 4/2004 | Crockett et al. |
| 6,771,742 B2 | 8/2004 | McCalmont et al. |
| 6,792,081 B1 | 9/2004 | Contractor |
| 6,804,338 B1 | 10/2004 | Chen |
| 6,842,448 B1 | 1/2005 | Norris et al. |
| 6,868,074 B1 | 3/2005 | Hanson |
| 6,912,399 B2 | 6/2005 | Zirul et al. |
| 6,940,950 B2 | 9/2005 | Dickinson et al. |
| 7,251,471 B2 * | 7/2007 | Boling et al. ............ 455/404.2 |
| 7,286,648 B1 * | 10/2007 | Chang et al. .................. 379/45 |
| 2002/0072348 A1 | 6/2002 | Wheeler et al. |
| 2002/0160745 A1 | 10/2002 | Wang |
| 2003/0109245 A1 * | 6/2003 | McCalmont et al. ........ 455/404 |
| 2003/0186709 A1 * | 10/2003 | Rhodes et al. ........... 455/456.1 |
| 2003/0211839 A1 | 11/2003 | Baum et al. |
| 2003/0216148 A1 | 11/2003 | Henderson |
| 2004/0037403 A1 | 2/2004 | Koch |
| 2004/0057425 A1 | 3/2004 | Brouwer et al. |
| 2004/0101123 A1 | 5/2004 | Garcia |
| 2004/0140928 A1 | 7/2004 | Cleghorn |
| 2005/0021735 A1 * | 1/2005 | Bodin et al. ................ 709/224 |
| 2005/0047574 A1 | 3/2005 | Reid |
| 2005/0063519 A1 | 3/2005 | James |
| 2005/0085257 A1 * | 4/2005 | Laird et al. .............. 455/550.1 |
| 2005/0151642 A1 | 7/2005 | Tupler et al. |
| 2005/0153681 A1 * | 7/2005 | Hanson .................... 455/404.2 |
| 2005/0175166 A1 | 8/2005 | Welenson et al. |
| 2005/0190750 A1 | 9/2005 | Kafka |
| 2005/0190892 A1 | 9/2005 | Dawson et al. |
| 2005/0209770 A1 * | 9/2005 | O'Neill et al. .............. 701/117 |
| 2005/0232243 A1 | 10/2005 | Adamczyk |
| 2005/0250468 A1 | 11/2005 | Lu |
| 2005/0272446 A1 * | 12/2005 | Liou ....................... 455/456.5 |

OTHER PUBLICATIONS

US 5,905,788, 05/1999, Bauer et al. (withdrawn)

* cited by examiner

SYSTEMS AND METHODS FOR PROVIDING LOCATION SIGNALS/INDICATORS WHEN 911 DIALED

CROSS REFERENCE TO RELATED APPLICATION

This application is a continuation of commonly assigned U.S. patent application Ser. No. 10/768,800 entitled "Systems & Methods for Providing Location Signals/Indicators When 911 Dialed," filed on Jan. 30, 2004, now U.S. Pat. No. 7,068,760 and of which is incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

The exemplary embodiments generally relate to the field of communications, and more specifically, to systems and methods for a telecommunications network to locate a communications device when an emergency communication originates from the communications device.

In emergency situations, timely assistance provided by emergency service personnel is often critical to minimize injuries, save lives, and/or minimize property damage. Often times, a mere delay of a few minutes, or even a matter of seconds, may have severe consequences in saving the life of an individual, such as an individual having a heart attack or an individual suffering from severe blood loss. Likewise, delays in reaching the scene of a fire or other catastrophic event may have catastrophic consequences to property damage. Thus, the time it takes for emergency personnel, such as, police, fire, and medical personnel, to reach the location to respond to the emergency makes a difference.

In an effort to increase the response speed of emergency response personnel, centralized emergency response telephone services, such as, for example, 911 and enhanced 911, have been implemented so that dispatch personnel at the answer center are provided with detailed information (e.g., an address of a home, business, or other location associated with the calling phone number, special needs of individuals at the calling phone number, a database of other 911 calls from that phone number and how they were responded to in the past, and so on) and provided with access to a wide variety of emergency response personnel to implement appropriate assistance necessary to respond to the emergency. For example, if a 911 caller reported a fire in a home from the calling phone number, then the dispatch personnel notify the fire department closest to the home to control the fire, and if appropriate, also notify nearby medical personnel to treat any victims of the fire and/or notify nearby law enforcement to control potentially hazardous situations, such as hysteria of the residents and/or crowds.

Unfortunately, a delay in reaching the location of the emergency may occur when the location of the calling phone number is different than the location of the emergency. For example, if a user of a cellular phone places the call to 911, then the address of the home with the emergency may not be provided to the dispatch personnel, especially if the caller is emotionally or physically distraught and unable to communicate the address. Still another example is when a call to the dispatch center is called from a calling phone associated with a different street address, such as a call from a neighbor's house to report a fire. In such a case, the detailed information that accompanies the incoming call to the dispatch center does not provide an accurate street address, rather the street address of the fire (i.e., the actual location of the emergency) must be provided by the calling party and/or approximated by the dispatch center. Because this address is often imprecise, the responding emergency personnel may be delayed trying to locate an approximated street address of the emergency, such as trying to look for a signs of an emergency in an area proximate to the approximated street address, going to the address of the third party caller to seek assistance in locating the emergency, and trial and error of knocking on doors until the precise street address and location are determined.

Even when a street address of the location of the emergency is known, the emergency personnel may still experience delays in locating the emergency premises. For example, when the responding emergency response personnel near the street address at which the request for emergency response assistance originated (e.g., the home), the personnel is often unfamiliar with the exact street address and is forced to proceed at a slower pace in order to precisely locate the street address. Further, the task of locating the exact street address can be more difficult when visibility conditions are poor, such as at night, when there is precipitation, and/or when there is smoke or other environmental and/or wildlife conditions that inhibit visibility. This task may be even more difficult when the home of the originating call is located in an area where the homes are far apart, road signs are difficult to find and/or read, and/or addresses are not easily visible on the exterior of the home or other outbuilding of the home (e.g., a mailbox).

And, even after the home is located, the emergency response personnel may experience further delays locating the victim and/or locating the party that placed the call to the emergency response call center. For example, if a calling party uses a wireless handset associated with a landline phone number to place the emergency call, then the emergency response call center may know the residential address associated with the landline phone number; however, the emergency response call center will not know the location of the handset. For example, if there is a fire in the home and the calling party placed the call from a home phone, then it would be beneficial if the emergency response personnel knew where the handset was in the home (e.g., the basement, second floor bedroom, and so on) because that might help locate the calling party and/or other victims.

Accordingly, what is needed are systems, methods, and apparatus that provide an emergency locating system to overcome and/or improve the above and other problems to minimize the amount of time it takes for emergency response personnel to reach the street address, a more precise location of an emergency, and/or a location of the calling party and/or victim. In addition, what are needed are emergency locating systems, methods, and apparatus that are easy to install, manage, and/or use.

SUMMARY

According to exemplary embodiments, the needs described above and other needs are met by methods, systems, computer programs, and computer program products to locate an associated communications device at an emergency site. Typically, a calling party uses a communications device to communicate an emergency message over a communications network to an emergency response call center (e.g., a 911 call for help). The communications network detects, decodes, and connects the communications signal to the emergency response center. At the same time, or nearly the same time, the communications network associates the communications signal from the calling party's communications device with an Emergency Locator Profile that includes a communications address of a local communications network (also referred to herein as "local network") and information about the type of emergency locating system. An Emergency Locator Application uses the profile to generate and to communicate an Emergency Locator Signal over the communications network to the communications address of the local communications network. According to some of the embodiments of this invention, the Emergency Locator Signal may communicate with the local communications address to identify a building location (i.e., the location within the home, business, or building where the communications device is usually located, such as, for example, a room where the communications device connects or is otherwise coupled with a telephone line, a cable line, and/or an electrical line) of an associated communications device. For example, the associated communications device may be a Plain Old Telephone System (POTS) phone that is connected or otherwise coupled with the telephone line in a particular room of the house, such as, a "first floor room," "basement," "kitchen," "living room," "second floor bedroom," and so on. So if the POTS phone is connected to the telephone line in the basement of the house, then the POTS phone is identified as "basement." In alternate embodiments, the Emergency Locator Signal may communicate with the local communications address to activate position locating means of the communications device. For example, the local communications network may communicate or broadcast a signal to that is unique to a selected communications device to activate the position locating means. The position locating means may include a variety of systems. For example, the position locating means may be a transmission signal to a networked device that associates a room location with the signal and that room location is then communicated to emergency response personnel. Alternatively, the position locating means may be a homing signal, a Global Positioning System, and the like that enable emergency response personnel to receive signals directly from the communications device.

According to exemplary embodiments, an emergency communications system includes a communications network and an Emergency Locator Application. The communications network detects, decodes, and communicates a communications signal to an emergency response communications address, such as, for example, a centralized emergency response call center (e.g., 911), a police station, a fire station, a poison control center, an ambulance service, and/or the like. The communications network includes an Emergency Locator DataServer that stores an Emergency Locator Profile. The Emergency Locator Application uses the profile to generate an Emergency Locator Signal. When the communications signal is decoded by the communications network, the profile is associated with the signal and the application uses fields and/or files of the Emergency Locator Profile to determine a communications address of the local communications network and/or information about a location of an associated communications device at a geographic location of an Emergency Communications Address. According to further embodiments, a communications link may be established between the communications network and the local communications address of the local communications network to communicate the Emergency Locator Signal and to further identify the location of the associated communications device at the geographic location of the Emergency Communications Address. Further, the communications network may include a public switched telephone network, a mobile switching telephone communications network, and a satellite communications network. Still further, the communications network may include a world wide electronic data communications network that enables a user interface via an internet, an intranet, and/or an extranet.

According to other exemplary embodiments, a communications method includes (1) processing an incoming communications signal from a calling party's communications device to an emergency response communications address, (2) associating an incoming line identification (ICLID) signal and/or an enhanced emergency response identification signal with the incoming communications signal, (3) associating an Emergency Locator Profile, and (4) generating an Emergency Locator Signal. Similar to above, when the Emergency Locator Signal is communicated to a communications address of the local communications network, the Emergency Locator Signal accesses a local communications network to identify a location of a communications device at a geographic location of an emergency communications address. The method may further include using an instruction transmitted from the calling party's communications device and/or an instruction transmitted from the emergency response communications address to generate the Emergency Locator Signal and/or to modify the Emergency Locator Signal. According to further embodiments, methods of this invention may include (1) communicating an identifier of a building location of the communications device to the communications network, (2) communicating the identifier of the building location of the communications device to the emergency response communications address. Still further embodiments may include (1) activating position locating transmission means of the communications device, (2) associating the transmitted position location transmission means with a particular room location of the communications device, (3) communicating the room location of the communications device to the communications network, and (4) communicating the room location of the communications device to the emergency response communications address.

According to further exemplary embodiments, another communications method includes (1) receiving a communications signal from a calling party's communications device to a communications network and (2) using the communication signal to generate an Emergency Locator Signal that is capable of communicating with a local communications network to identify a location of the calling party's communications device at a geographic location of an Emergency Communications Address. The communications network may include a public switched telephone network and/or a mobile switching telephone communications network.

According to still other exemplary embodiments, a computer program product includes a computer-readable medium and an Emergency Locator Module stored on the computer-readable medium. The Emergency Locator Module is stored in a memory device. Further, the Emergency Locator Module generates an Emergency Locator Signal and initiates communication of the Emergency Locator Signal to a communications address of the local communications network. The Emergency Locator Signal is capable of accessing a local communications network to identify a location of the calling party's communications device at a geographic location of an Emergency Communications Address and to communicate the location to the communications network and/or emergency response personnel (e.g., an emergency response communications address). The communications network may include a public switched telephone network and/or a mobile switching telephone communications network.

Other systems, methods, and/or computer program products according to embodiments will be or become apparent to one with skill in the art upon review of the following drawings and detailed description. It is intended that all such additional systems, methods, and/or computer program products be included within and protected by this description and be within the scope of the present invention. As is appreciated by those of ordinary skill in the art, this invention has wide utility in a number of areas as illustrated by the discussion below. These embodiments may be accomplished singularly, or in combination, in one or more of the implementations of the exemplary embodiments.

DESCRIPTION OF THE DRAWINGS

The above and other embodiments, objects, uses, advantages, and novel features of this invention are more clearly understood by reference to the following description taken in connection with the accompanying figures, wherein.

DESCRIPTION

Figure 1:
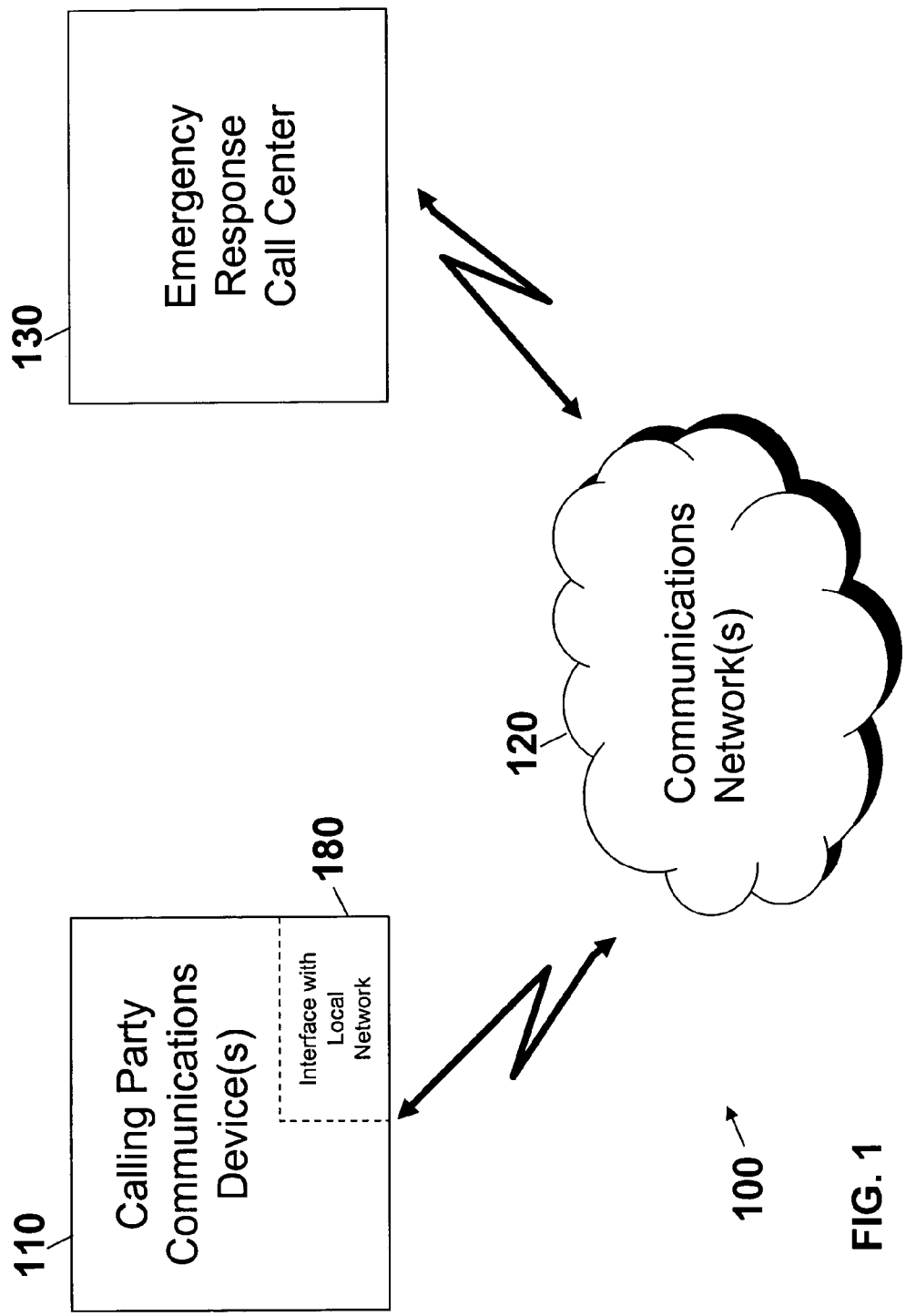
FIG. 1 is a schematic of a communications system illustrating a communications network connecting a calling party's communications device interfacing with a local communications gateway and an emergency response call center according to some of the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

As used herein, the term "communications device" includes wired and wireless communications devices, such as a POTS phone, a mobile phone, a wireless phone, a WAP phone, a satellite phone, a computer, a modem, a pager, a digital music device, a digital recording device, a personal digital assistant, an interactive television, a digital signal processor, and a Global Positioning System device. Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with a receiving party, and/or (4) one or more Emergency Locator Profiles associated with the Emergency Locator Signal. In various embodiments, the data may be stored by one or more communications network, a peripheral storage device connected to the communications network, other connected networks, and/or one or more communications devices.

Exemplary embodiments of this invention provide systems, methods, and computer program products that operate with different communications devices, different users, and different communications networks to generate, enable, and/or transmit an Emergency Locator Signal via the communications network to a communications address of the local communications network. Typically, a calling party uses a communications device to communicate an emergency message over a communications network to an emergency response call center (e.g., a 911 call for help). The communications network detects, decodes, and connects the communications signal to the emergency response center. At the same time, or nearly the same time, the communications network associates the communications signal from the calling party's communications device with an Emergency Locator Profile that includes a communications address of a local communications network and information about the type of emergency locating system. An Emergency Locator Application uses the profile to generate and to communicate an Emergency Locator Signal over the communications network to the communications address of the local communications network. According to some of the embodiments of this invention, the Emergency Locator Signal may communicate with the local communications address to identify a building location (i.e., the location in the building where the communications device is usually located, such as, for example, a room where the communications device connects or is otherwise coupled with a telephone line, a cable line, and/or an electrical line) of an associated communications device. For example, the associated communications device may be a Plain Old Telephone System (POTS) phone that is connected or otherwise coupled with the telephone line in a particular room of the house, such as, a "first floor room," "basement," "kitchen," "living room," "second floor bedroom," and so on. So if the POTS phone is connected to the telephone line in the basement of the house, then the POTS phone is identified as "basement." In alternate embodiments, the Emergency Locator Signal may communicate with the local communications address to activate position locating means of the communications device. For example, the local communications network may communicate or broadcast a signal to that is unique to a selected communications device to activate the position locating means. The position locating means may include a variety of systems. For example, the position locating means may be a transmission signal to a networked device that associates a room location with the signal and that room location is then communicated to emergency response personnel. Alternatively, the position locating means may be a homing signal, a Global Positioning System, and the like that enable emergency response personnel to receive signals directly from the communications device.

Referring now to the figures, FIG. 1 illustrate a communications system 100 including a calling party's communications device 110 having an interface with a local communications network 180 (e.g., a shared communications address, an established communications link, and so on), at least one communications network 120, and an emergency response call center 130. Typically, the calling party (e.g., a customer and/or a user) subscribes to a network-enabled Emergency Locator Service. When the calling party uses his/her communications device 110 to communicate an emergency message (also referred to herein as "an incoming communications signal") over the communications network 120 to the emergency response call center 130 (e.g., a 911 call for help to a centralized emergency response dispatch center), the communications network 120 detects, decodes, and connects the incoming communications signal to the emergency response call center 130. At the same time, or nearly the same time, the detected communications address (e.g., 911, a phone number and/or an IP address associated with the emergency response call center 130, and other communications address of emergency response providers) of the emergency response call center 130 triggers the communications network 120 to associate the incoming communications signal with an Emergency Locator Profile that includes a communications address of the local communications network 180 and information about locating an associated communications device at an emergency communications address (i.e., a communications device at an emergency site). An Emergency Locator Application uses the Emergency Locator Profile to generate and/or communicate an Emergency Locator Signal over the communications network 120 to the communications address of the local communications network 180. The Emergency Locator Signal may access an information system of the local communications network 180 to determine a building location, such as identifying a room with the associated communications device located in the room. The building location is then communicated over the communications network 120 to the emergency call center 130, and, ultimately, to the emergency response personnel so they can more quickly locate a potential victim in the building location. Alternatively, the Emergency Locator Signal may activate, deactivate, and/or monitor a position locating means of the associated communications device, such as activating a homing signal or GPS signal of the communications device. When activated, the position tracking means of the associated communications device enables emergency personnel to more quickly locate the associated communications device in proximity to a potential victim. For example, the position locating means may be visual, such as a flashing light or other eye-catching visual indicator integrated into the associated communications device to allow emergency response personnel to notice the visual indicator and more quickly locate a potential nearby victim. Still another example, is an audible alert, such as a ringer that continuously makes a ringing noise and allows emergency response personnel to hear the ringer and more quickly locate a potential nearby victim. And, yet another example is activation of a transmission signal (e.g., a homing signal, Global Positioning System, and the like) for emergency response personnel to receive signals from and track their approach to the associated communications device in proximity to a potential nearby victim.

According to an exemplary embodiment shown in FIG. 1, the calling party's communications device 110 and the local communications network 180 share the same communications address for transceiving (e.g., transmitting and/or receiving) communications signals with the communications network 120. That is, the communications address of the calling party's communications device 110 (e.g., the phone number of the calling party's communications device 110) is the same as the communications address of the local communications network 180 that receives the Emergency Locator Signal from the communications network 120. In such a case, the communications network 120 may transmit a databurst (and/or make use of other medium for transmitting communications signals over the network) to the residential network 180 while the calling party's communications device 110 is in an off-hook state (e.g., when the calling party's communications device 110 is engaged in a voice connection/communication with the emergency response call center 130 and/or alternate third party (not shown)). The communications network 120 may use any means and/or medium for transmitting the Emergency Locator Signal to the emergency alert 140 and may transmit the Emergency Locator Signal to a communications address of the local communications network 180 having an on-hook state or an off-hook state.

Figure 2:
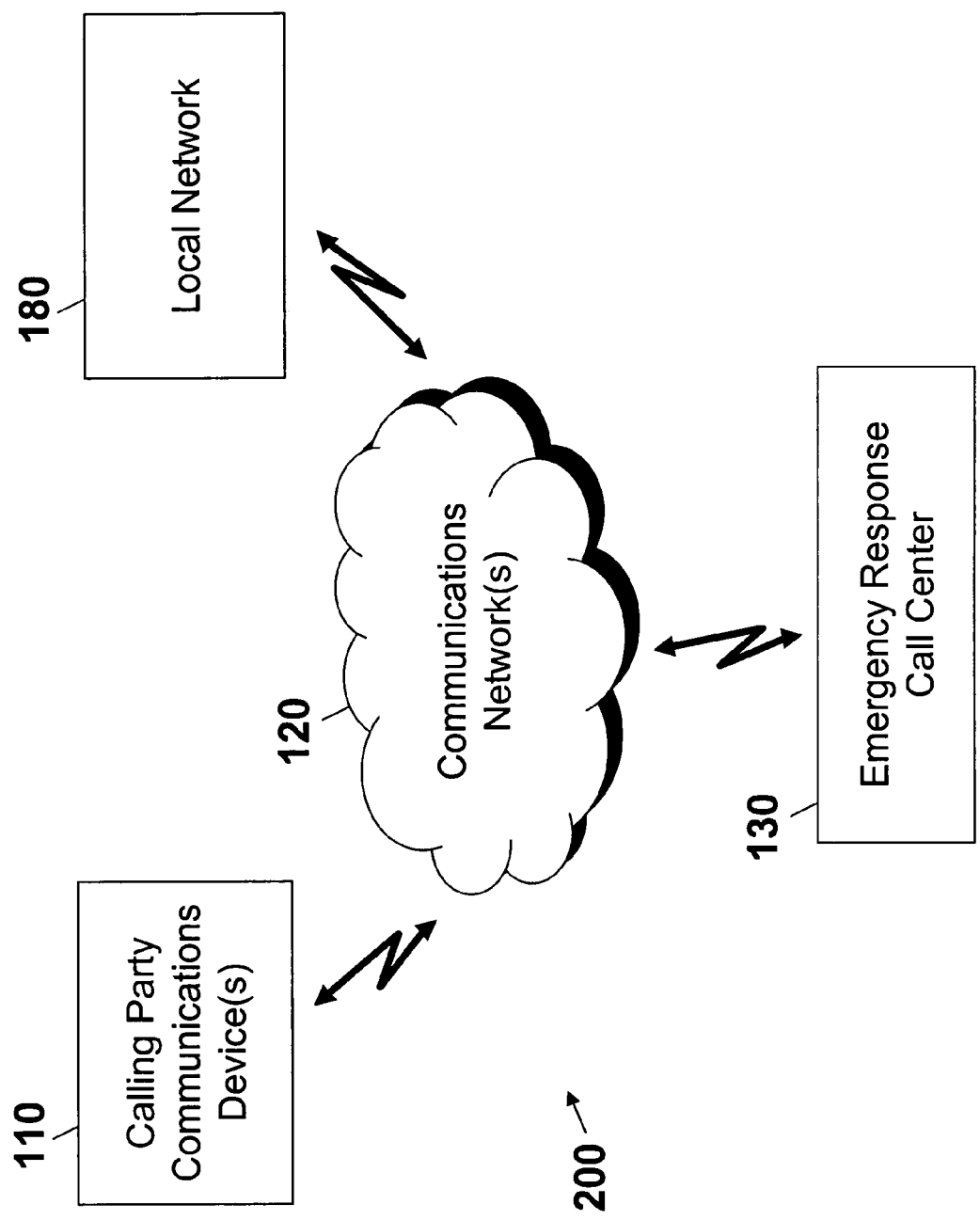
FIG. 2 is a schematic of another communications system illustrating a communications network connecting a calling party's communications device, an emergency response call center, and a local network according to some of the embodiments of this invention.

FIG. 2 is a schematic of another exemplary communications system 200 similar to the communications system 100 disclosed in FIG. 1. However, the communications system 200 illustrates the residential network 180 having a different communication address than the calling party's communications device 110. That is, the communications address of the local communications network 180 is different from the communications address of the calling party's communications device 110. Consequently, the calling party may use his/her communications device 110 anywhere (e.g., at the site of the emergency or at a remote site) to call the emergency response call center 130 and initiate network-based control to access a location or to activate location positioning means of the communications device communicating with the residential network 180. For example, the calling party's communications device 110 may be a cellular phone, and the calling party could use the cellular phone from anywhere in a connected cellular network to call the emergency response call center 130 and to initiate transmission of the Emergency Locator Signal to the associated communications device at the emergency site.

Figure 3:
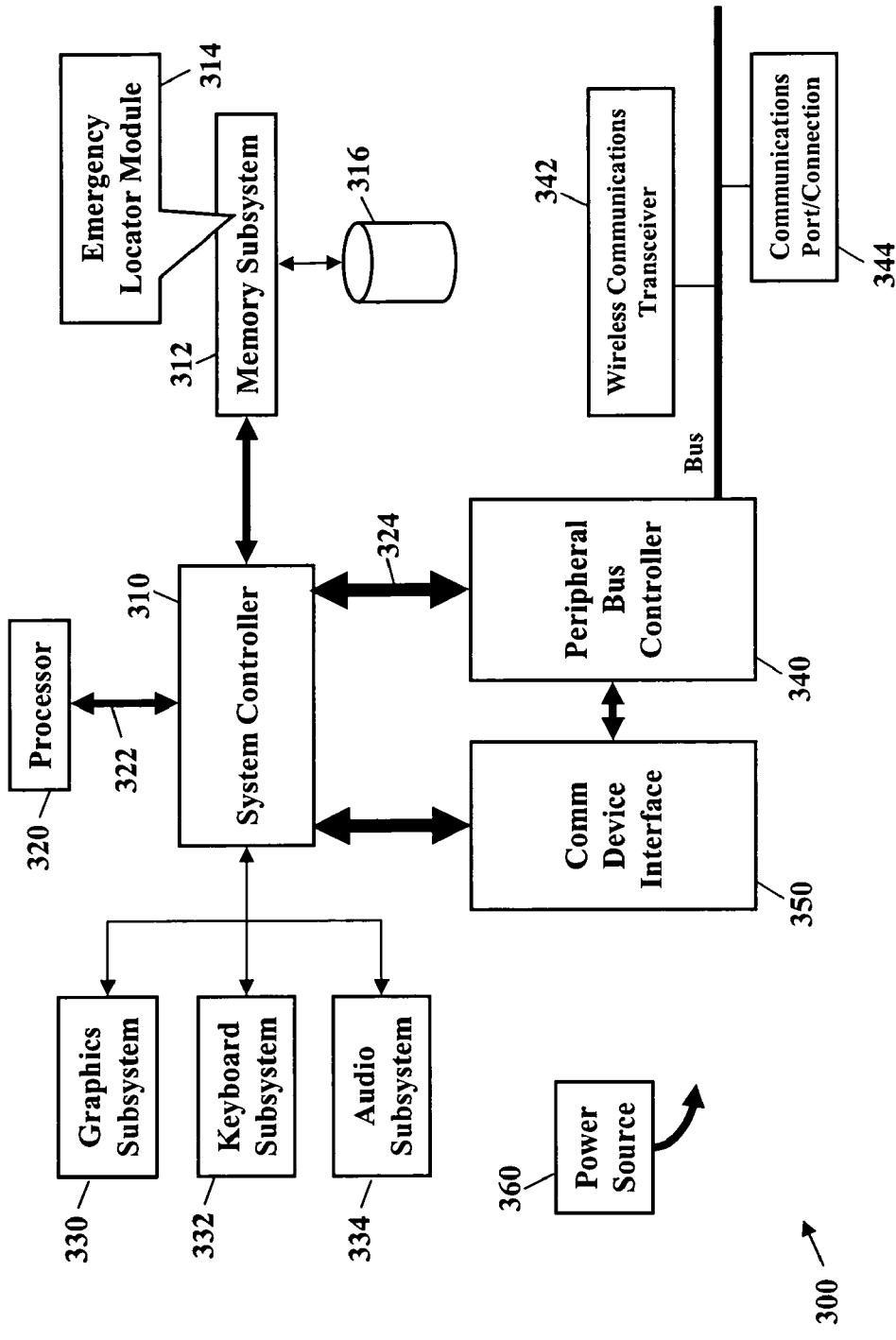
FIG. 3 is a block diagram of an Emergency Locator Module residing in a computer system according to some of the embodiments of this invention.

FIG. 3 is a block diagram showing an Emergency Locator Module 314 that operates within a system memory device 312 of a computer 300. The Call Ticker Module 314, however, could also reside in flash memory, a peripheral storage device 316, and/or a communications device (such as, for example, the calling party's communications device 110 of FIG. 1).

The computer 300 also has one or more central processors 320 executing an operating system. The operating system, as is well known, has a set of instructions that control the internal functions of the computer 300. A system bus 322 communicates signals, such as data signals, control signals, and address signals, between the central processor(s) 320 and a system controller 310. The system controller 310 provides a bridging function between the memory subsystem 312, the one or more central processors 320, a graphics subsystem 330, a keyboard subsystem 332, an audio subsystem 334, a PCI (Peripheral Controller Interface) bus 324, and a Communications ("Comm") Device Interface 350. The PCI bus 324 is controlled by a Peripheral Bus Controller 340. The Peripheral Bus Controller 340 is an integrated circuit that serves as an input/output hub for various peripheral ports and/or transceivers. These peripheral ports allow the computer 300 to communicate with a variety of communications devices through networking ports (such as SCSI or Ethernet) that include Wireless Communications ("Comm") Device Transceiver 342 (such as Wireless 802.11 and Infrared) and Wired Communications ("Comm") Device Port/Connection 344 (such as modem V90+ and compact flash slots). These peripheral ports could also include other networking ports, such as, a serial port (not shown) and/or a parallel port (not shown). The Comm Device Interface 350 allows the computer 300 to monitor, detect, receive, and decode incoming communications signals to the communications device(s) connected to the Wireless Comm Device Transceiver 342 and/or the Wired Comm Device Port/Connection 344. Further, the Comm Device Interface 350 may communicate the Emergency Locator Signal to the Wireless Comm Device Transceiver 342 and/or the Wired Comm Device Port/Connection 344 which may thereafter communicate the Emergency Locator Signal via the communications network 120 to the residential network 180. According to alternate embodiments, the Wireless Comm Device Transceiver 342 and/or the Wired Comm Device Port/Connection 344 may communicate the Emergency Locator Signal directly to the residential network 180. Returning back to FIG. 3, the computer 300 may include a power source 360, such as a rechargeable battery to provide power and allow the computer 300 to be portable. In alternate embodiments, the computer 300 could include its own telephone line (or other communications connection and/or communications address) to the communications network 120 (not shown). Another alternative may include the computer 300 incorporated into a component of the communications network 120 (such as integrated componentry with an Emergency Locator DataServer 418 of FIG. 4) or a specially designed communications device (not shown).

Those of ordinary skill in the art also understand the central processor 320 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

An exemplary operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C. 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 312 or peripheral storage device 316) may also contain one or more application programs. For example, an application program may cooperate with the operating system and with a video display unit (via graphics subsystem 330) to provide a GUI for the Emergency Locator Module 314. The GUI typically includes a combination of signals communicating with the graphics subsystem 330 and/or the keyboard subsystem 332. The GUI provides a convenient visual and/or audible interface with the user of the computer 300. As is apparent to those of ordinary skill in the art, the user (e.g., receiving party, calling party, and/or administrator) interacts with the Emergency Locator Module 314 over a variety of mediums, such as, for example, a stylus, keyboard, and punch buttons of the keyboard subsystem 332, a display screen of the graphics subsystem 330, and/or a voice-activated menu prompt of the audio subsystem 334.

Figure 4:
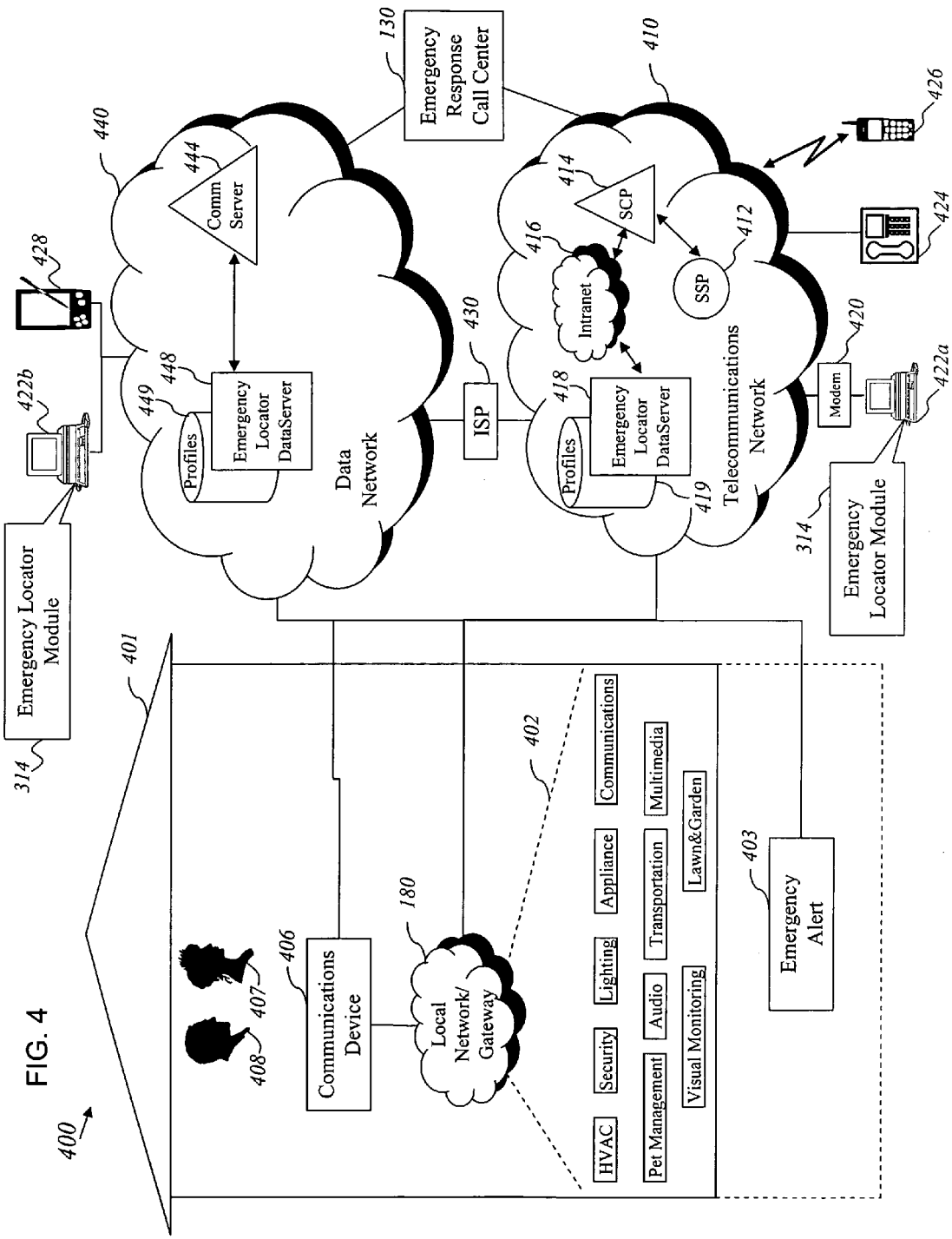
FIG. 4 is another schematic of an emergency locator communications system illustrating communication connections of different communications networks, different users, and different communications devices according to some of the embodiments of this invention.

FIG. 4 is a schematic of a communications system 400 illustrating communications connections of different communications networks, different communications devices, and different users that generate, enable, and/or transmit an Emergency Locator Signal via one or more communications networks to a communications address of the local communications network 180. The communications system includes a home 401 having the local communications network 180, at least one electronic device 402, an emergency alert 403, a communications device 406, at least one user 407, 408, a telecommunication network 410 having a Service Switching Point (SSP) 412, a Service Control Point (SCP) 414, an Intranet (for the telecommunications provider to administer and program the telecommunications network 410 components and/or for the subscriber/user to access, program, and/or otherwise manage a Emergency Locator Profile), an Emergency Locator DataServer 418, and a database of Emergency Locator Profiles 419, an Internet Service Provider (ISP) 430 (e.g., America On-Line), a data network 440 having a communications server 444, an Emergency Locator DataServer 448, and a database of Emergency Locator Profiles 449, and an emergency response call center. The telecommunications network 410 communicates with a variety of communications devices, such as, a modem 420 coupled with a personal computer 422a having the Emergency Locator Module 314, a POTS phone 424, and a cellular phone 426 (via a wireless connection). Similarly, the data network 440 communicates with a variety of communications devices, such as, for example, a personal computer 422b having the Emergency Locator Module 314 and the personal digital assistant 428.

According to some of the embodiments of this invention, the communications network 120 detects and decodes an incoming line identification signal (ICLID) of an incoming communications signal (or alternate network identification signal) to the emergency response call center 130 and connects the call. The incoming communications signal may originate from any of the communications devices (e.g., reference numerals 406, 420, 422a, 422b, 424, 426, and 428, and other communications devices described herein) in any of the communications networks (e.g., reference numerals 180, 410, 440, and others communications networks described herein). In an embodiment, the telecommunications network 410 compares the incoming communications signal with an Emergency Locator Profile stored in one or more databases 419 to determine one or more communications address of the local communications network 180, the type of location system, caller control parameters, notification parameters, and/or other Emergency Locator activation, deactivation, and control information. As shown in FIG. 4, the incoming communications signal arrives at SSP 412 that analyzes the signal (s) and routes the incoming communications signal to the SCP 414. If the SCP 414 detects a communications address of the incoming communications signal (e.g., the phone number of the calling party's communications device) and a communications address of the emergency response call center 130, then the SCP 414 attempts to match the communications address of the incoming communications signal with the Emergency Locator Profile. That is, the SCP 414 communicates with the Intranet 416 and with the Emergency Locator DataServer 418 (or alternatively, directly with the Emergency Locator DataServer 418) to accesses the database 419 of Emergency Locator Profiles to determine Emergency Locator Services associated with the communications address of the incoming communications signal. The matched Emergency Locator Profile contains parameters that establish the available Emergency Locator Services for the associated communications address. Thereafter, an Emergency Locator Application uses the Emergency Locator Profile to generate the Emergency Locator Signal, and the telecommunications network 410 transmits the Emergency Locator Signal to the communications address of the local communications network 180 to access an information system that contains a location of an associated communications device or to activate, deactivate, and/or monitor location positioning means of an associated communications device.

To create, modify, and/or access an Emergency Locator Profile, any of the communications devices (e.g., reference numerals 406, 420, 422a, 422b, 424, 426, and 428, and other communications devices described herein) accesses a locally stored and/or remotely stored Emergency Locator Module 314 that interfaces with one or more of the communications networks (e.g., reference numerals 404, 410, 440, and others communications networks described herein). For example, the telecommunications network 410 may present an interactive interface to the user of the communications device 406 that may be programmed over a variety of mediums, such as, for example, a voice-activated and/or Dual Tone Multi-Frequency (DTMF) menu prompt. The user, for example, might select to access stored Emergency Locator Profiles by entering a "1" on a touch-tone keypad or by speaking into a receiving audio subsystem and stating the word "one." After making a selection, the telecommunications network 410 retrieves the stored Emergency Locator Signal from a database and presents it to the user for additional instructions. Similarly, the user might select "2" to create and/or otherwise establish a new Emergency Locator Profile. In addition, the user might enter a code (e.g., "*99") in order to automatically block any communication of Emergency Locator Signals to a communications address. According to other embodiment, the user may alternatively contact (e.g., via a voice communication, via a web-based interface, and the like) a telecommunications service provider (or alternate communications provider) to have an administrator, other personnel, and/or componentry of the telecommunications service provider establish the Emergency Locator Profile. For example, the user may use the computer 422a and the Emergency Locator Module 314 to establish an Emergency Locator Profile that is communicated to telecommunications network 410. Alternatively, the user could use computer 422b and a web-based interface of the Data Network 440 to establish the Emergency Locator Profile. Regardless of how the Emergency Locator Profile is established, the Emergency Locator Profile is used to generate and/or otherwise manage the Emergency Locator Signal that is communicated to the emergency alert 140.

According to some of the embodiments of this invention, the database 519 of Emergency Locator Profiles and the Emergency Locator DataServer 518 control access, creation, notification, routing, security, transactions, troubleshooting, management, sharing, and/or additional processing of Emergency Locator Signals exchanged to/from the telecommunications network 410 with the residential network 180, other communications devices, and other communication networks. More specifically, the Emergency Locator Profile contains files and/or fields that contain: (1) an originating communications address associated with a calling party's communications device, (2) the communications address of the local communications network, (3) a communications device associated with the communications address of the local communications network, (4) an identifier of a building location of the communications device, (5) a parameter for controlling position locating means of the communications device, (6) a parameter for monitoring the position locating means, (7) a parameter to enable calling party control of the position locating means, and (8) a notification parameter for notifying a third party of the building location and/or of activation of the position locating means. Still further, the Emergency Locator Profile may include parameters for (1) archiving the Emergency Locator Profile to a storage device associated with the telecommunications service provider and/or archiving to alternate storage devices, (2) encrypting the Emergency Locator Signal (or a portion of the Emergency Locator Signal) so that only the communications address of the local communications network and/or emergency alert 140 can decipher the Emergency Locator Signal, (3) copying the Emergency Locator Profile, and (4) associating the Emergency Locator Profile with a variety of fields, files, and/or other data for Emergency Locator Services, such as, for example login information associated with the customer, user, and/or administrator, password, telephone number(s) or Service Node(s) of the customer (this may include a plurality of addresses that are associated with a Service Node or other communications switch serving the calling party's communications device), TCP/IP address of the customer, email address of the customer, a time or date identifier (e.g., day of week or calendar date), other information associated with the incoming line identification (ICLID) communications signal, size and content of Emergency Locator Signal, reply(s), delivery failure notification(s), display and/or presentation data associated with a GUI (e.g., color, font, placement of the Emergency Locator Module), and/or telecommunications network 410 defaults. Accordingly, the Emergency Locator DataServer 418 operating with the database 419 of profiles and with the Emergency Locator Application functions as a computer server, database, and/or processor that is dedicated to managing Emergency Locator Services including communications of Emergency Locator Signals over the telecommunications network 410 to other connected networks, communications devices, and/or the emergency alert 140. Communications ("Comm") Server 444 of data network 440 operates similar to SCP 414 of telecommunications network; Emergency Locator DataServer 448 and database 449 of data network 440 operate similar to Emergency Locator DataServer 418 and database 419 of telecommunications network 410.

Figure 5:
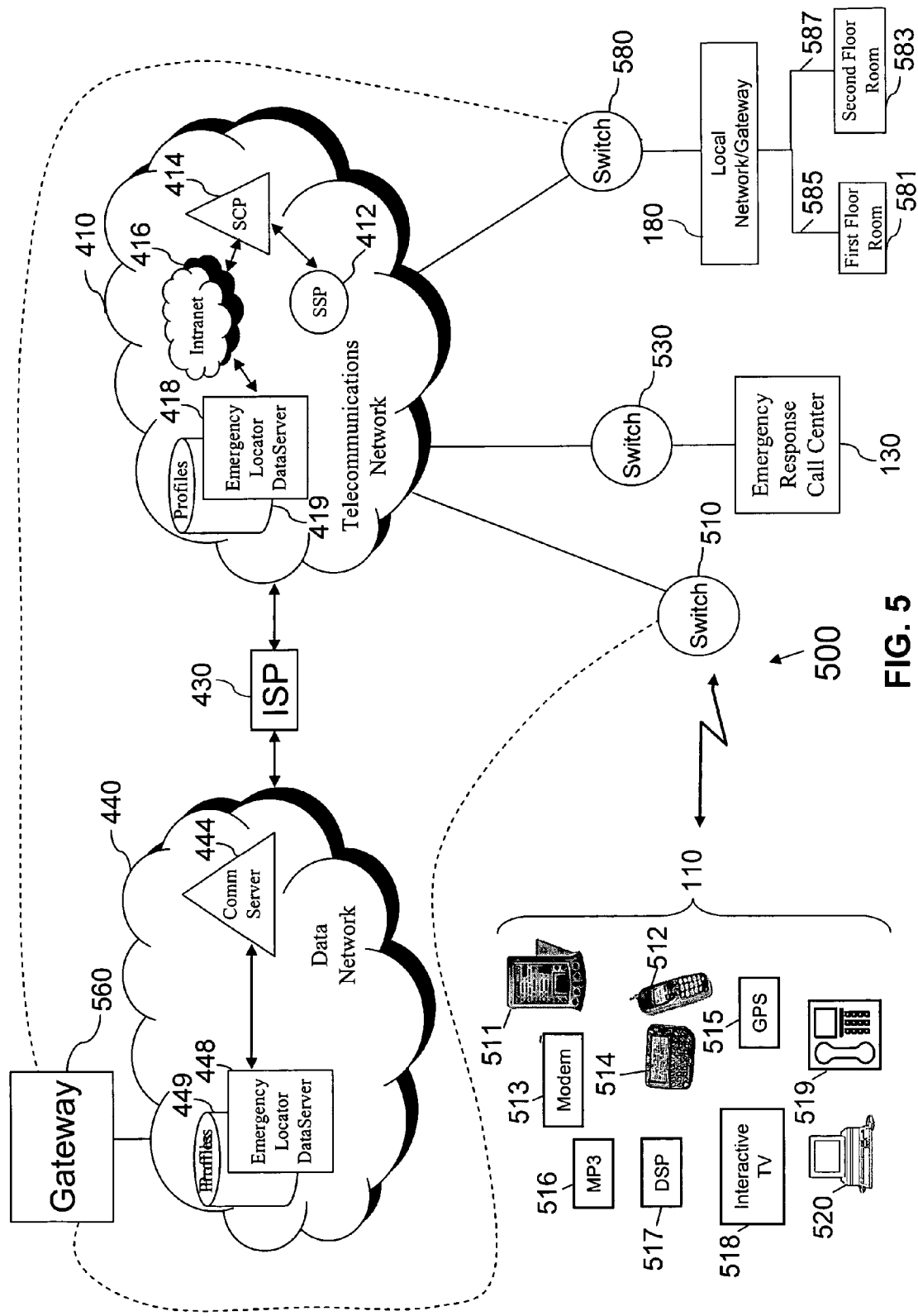
FIG. 5 is yet another schematic of an emergency locator communication system illustrating communication connections of different communications devices and different communications networks according to some of the embodiments of this invention.

FIG. 5 is a schematic of a communications system 500 similar to the communications system 400 disclosed in FIG. 4. However, the communications system 500 illustrates alternate communications links and a variety of communications devices that may be used by the calling party (i.e., calling party's communications device 110 of FIG. 1) including a Personal Digital Assistant (PDA) 511, an IP phone 512, a modem 513, an interactive pager 514, a global positioning system (GPS) 515, an MP3 player 516, a digital signal processor (DSP) 517, and an interactive television 518, a POTS phone 519, and a personal computer 520. Communications system 500 also illustrates a communications connection of the calling party's communications device 110 via switch 510 to the telecommunications network and to a gateway 560 communicating with data network 440 and with a switch 580 coupled and/or otherwise communicating with the residential network 180 having a first connection 585 to a communications device associated with a basement location 582 and having a second connection 587 to a communications device associated with a kitchen location 584. Still further, communications system 500 includes a switch 530 coupling the telecommunications network 410 with the emergency response call center 130. Regardless of the calling party's communications device (reference numerals 511-520) that places the call to the emergency response call center 130, the data network 440 and/or the telecommunications network 410 is able to communicate (including audio, text (e.g., ASCII), video, other digital formats, and combination thereof) with the calling party's communications device 110 to receive the incoming communications signal and to transmit response, notification, and/or alternate communications signals. Accordingly, the Emergency Locator DataServers 418, 448 and/or the gateway 560 of the data network 440 has the intelligence for appropriate formatting of communication signals to/from the calling party's communications device 110 and the associated communications device (shown as reference 406 in FIG. 4) of the residential network 180. For example, if the calling party's communications device uses the Wireless Application Protocol (WAP) technique, then a notification message (e.g., a communications signal that includes a message that the emergency alert has been activated, what type of alert it is, and so on) is formatted using the Wireless Mark-up Language (WML) and configured according to standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means. Alternatively, the communications signals (incoming communications signals, notification communications signals, response communications signals, control communications signals, and so on) may be formatted and/or otherwise configured for presentation by an application and/or componentry of the calling party's communications device 110.

As shown in FIG. 5, the telecommunications network 410 may alternatively transmit the Emergency Locator Signal via ISP 430 (or other connection) of the data network 440. The data network 440 communicates the Emergency Locator Signal via the gateway 560 to the calling party's communications device 560 via switch 510 and/or to an associated communications device, such as a first floor communications device 581 or second floor communications device 583. Similarly, the calling party's communications device 110 may generate and/or otherwise establish the Emergency Locator Signal and communicate the Emergency Locator Signal via the gateway 560 to data network 440 and/or to telecommunications network 410. Another embodiment discloses the telecommunications network 410 communicating the Emergency Locator Signal directly to the gateway 560 (such as when a Emergency Locator Profile associates a static IP address of the emergency alert) to communicate with the switch 580 coupled with the residential network 180. In addition to transmitting the Emergency Locator Signal, the telecommunications network 410 may also connect the calling party's communications device 110 with a third party's communications device (not shown) to establish an immediate voice connection (e.g., establish a telephone call) with both the emergency response call center 130 and with the third party. That is, for example, the Emergency Locator Profile may provide that Emergency Locator Signal include both a data burst to the communications address of the local communications network as well as a voice signal (that allows for a voice conversation) to communications address of a third party's communications device.

The communications switches (e.g., 510, 530, and 580) allows the connected communications devices to transceive electronic communication signals via the telecommunications network 410 (e.g., a central office (CO), a mobile telephone switching office (MTSO), and/or a combination CO/MTSO). The telecommunications network 410 may use any means of coupling the switches to the telecommunications network 410, but the coupling means is preferably high-capacity, high-bandwidth optical transport services, Gigabit Ethernet services, and/or the like. As those of ordinary skill in the art of telecommunications understand, the telecommunications network 410 could also link the switches via other appropriate means, such as, for example a Synchronous Optical Network (SONET) structure with redundant, multiple rings.

The telecommunications network 410 may include wired, optical, and/or wireless elements and may further include private network elements, such as private branch exchanges (PBXs), and/or other elements (not shown). The telecommunications network 410 includes Advanced Intelligent Network (AIN) componentry controlling many features of the network. The telecommunications network 410 and/or each of the switches could also include a packet-based "soft switch" that uses software control to provide voice, video, and/or data services by dynamically changing its connection data rates and protocols types. If the telecommunications network 410 and/or one of the switches should include a softswitch, the AIN componentry is replaced by an application server that interfaces with the softswitch via a packet protocol, such as Session Initiation Protocol (SIP). The means of communicating between or among the calling party's communications device 110, the emergency response call center 130, the communications address of the local communications network 180, the switches 510, 530, 580, the telecommunications network 410 including AIN componentry, and/or the data network 440 including the gateway 560 include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 602 standards, and Digital Subscriber Lines (DSL) are just some examples of the transmission means. The signaling between these devices and/or networks, however, is well understood in by those of ordinary skill the art and will not be further described. Further, those of ordinary skill in the art will be able to apply the principles of this invention to their own network configurations which may differ substantially from the communications system(s) shown in the figures.

Figure 6:
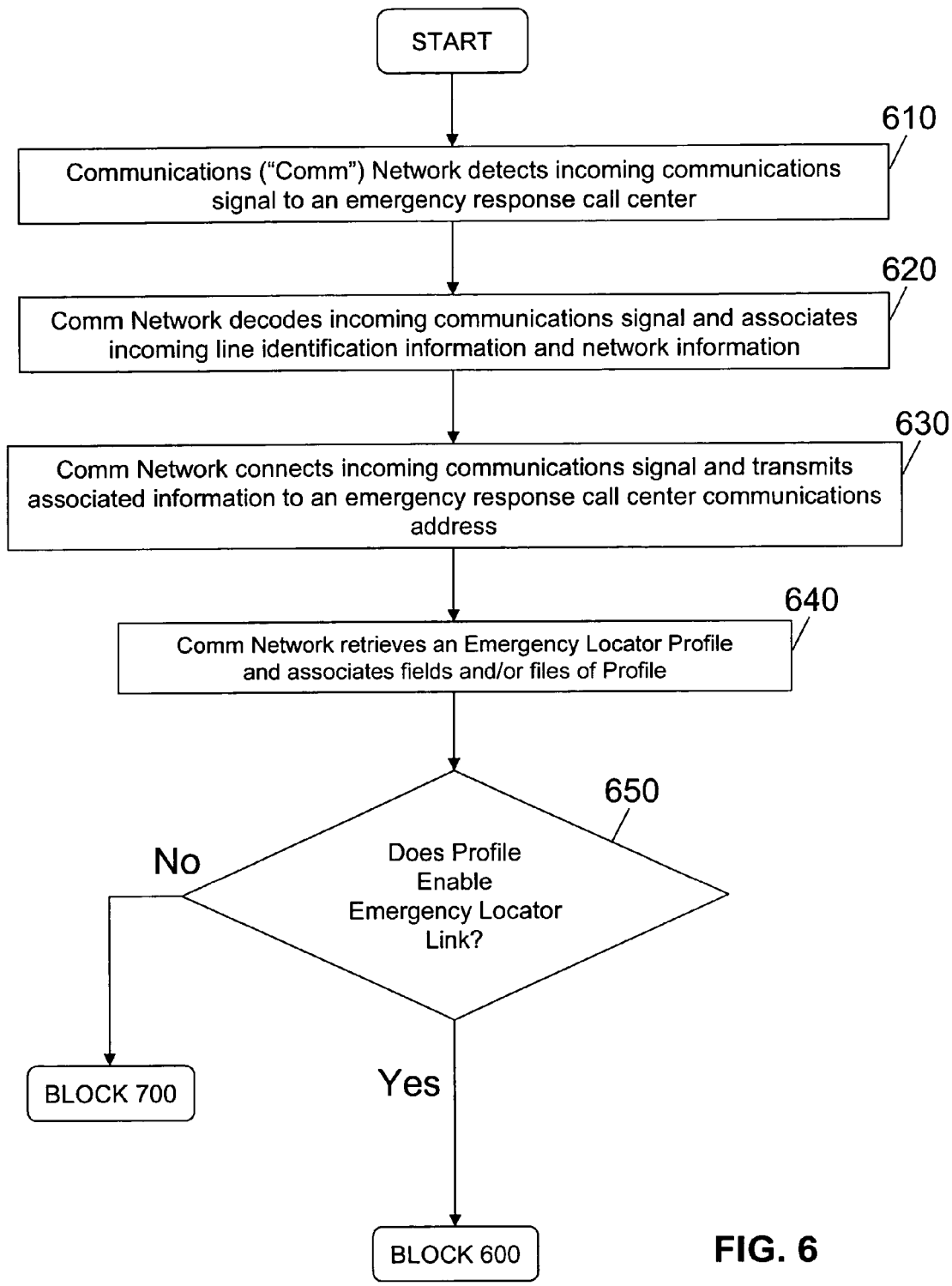
FIGS. 6-8 are flowcharts illustrating emergency locator communications methods according to some of the embodiments of this invention.
Figure 7:
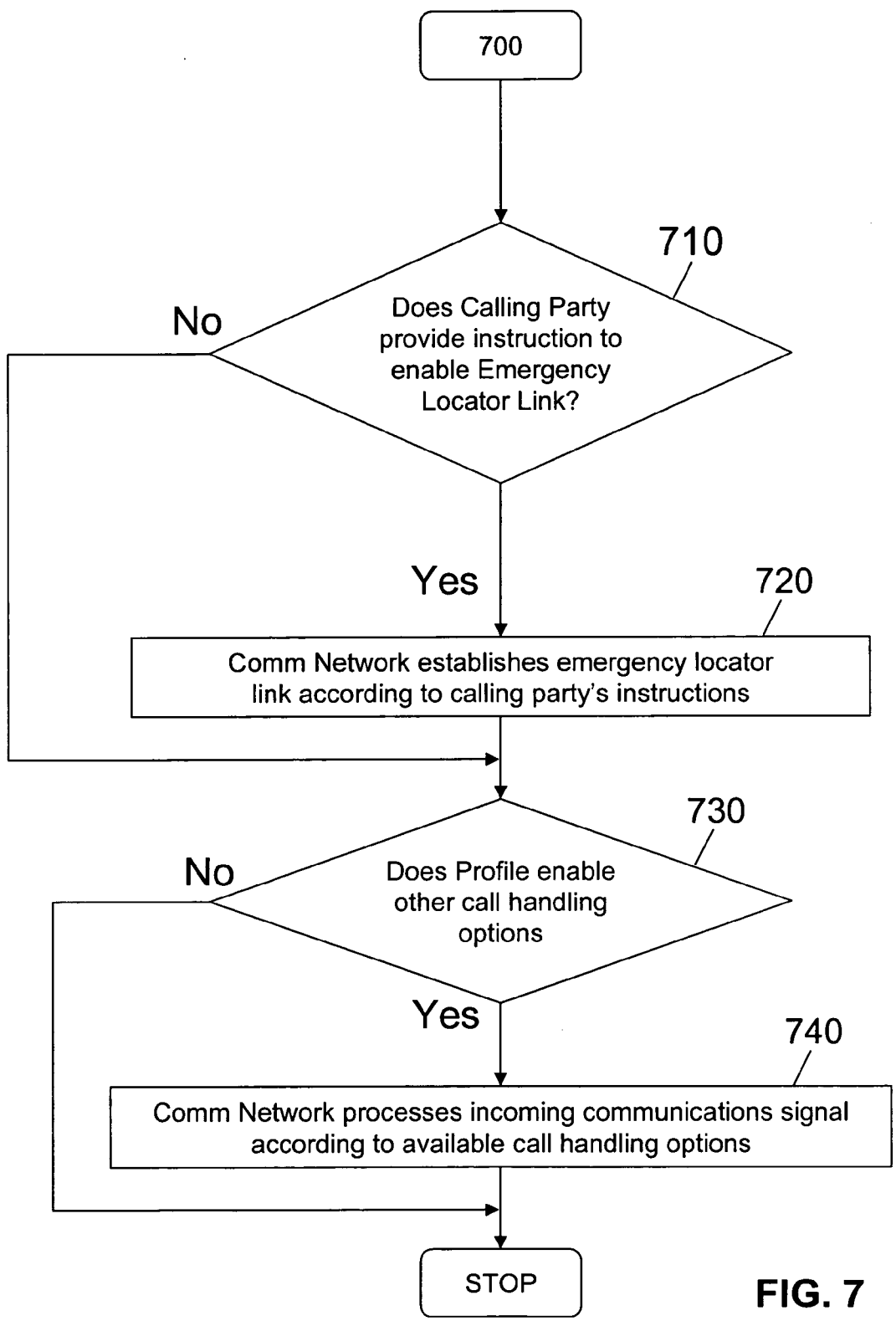
Figure 8:
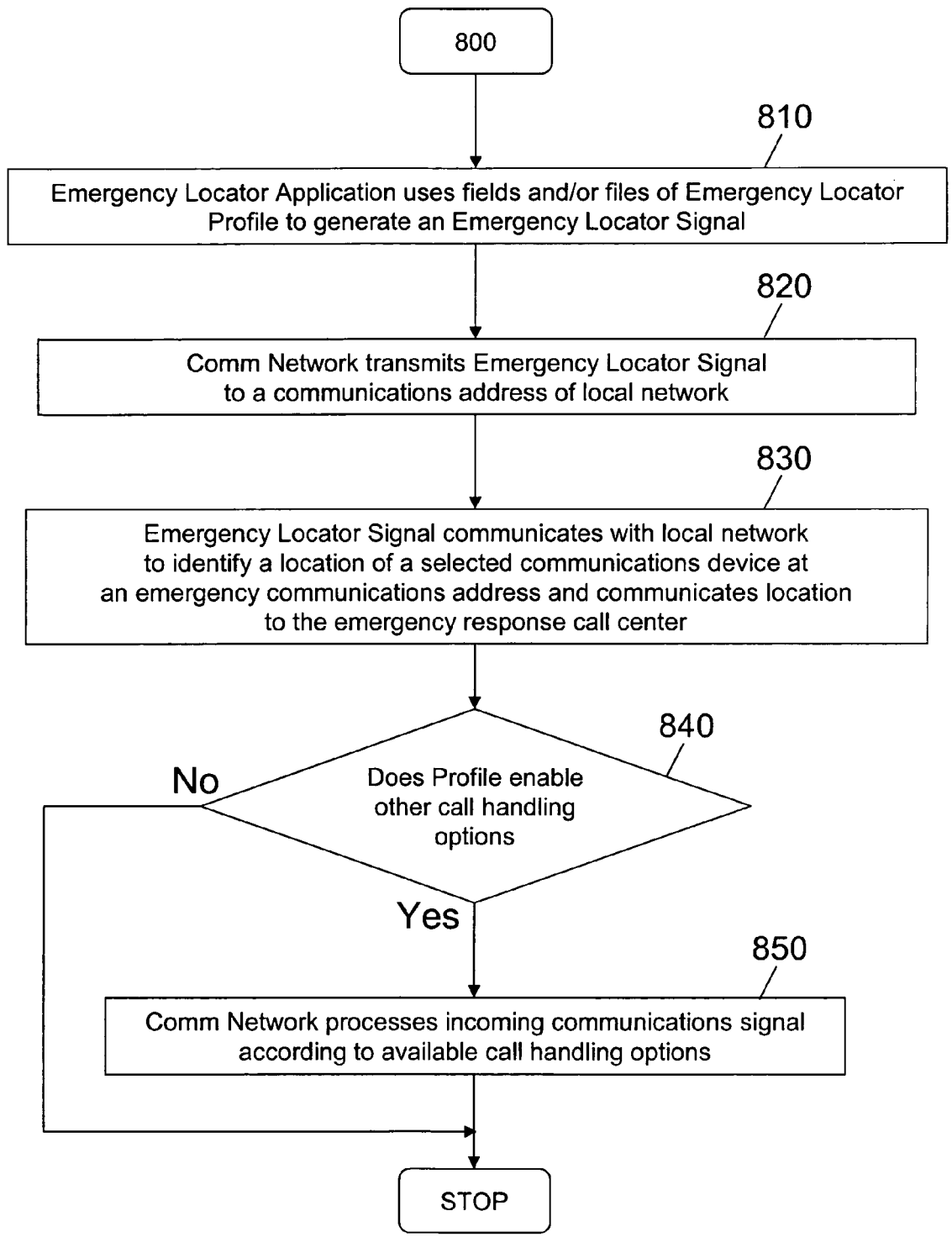

FIGS. 6-8 are flowcharts showing processes of providing the Emergency Locator Services according to some of the embodiments of this invention. While the processes in FIGS. 6-8 are shown in series, these processes may occur in different orders and/or at simultaneous times as one of ordinary skill in the art will understand.

A user uses a calling party's communications device to place an incoming communication to an emergency response call center and a communications ("Comm") network detects [block 610] and decodes the incoming communications signal and associated incoming line identification information and/or other network-based identification information [block 620]. Thereafter, the communications network connects the incoming communications signal to the emergency response call center and a voice connection or alternate communications link is established with the call center along with the incoming communications signal and associated incoming line identification information [block 630]. At the same time, or near the same time, the communications network matches an Emergency Locator Profile as described in the above embodiments [block 640] and determines if the profile enables a communication link with a residential network to locate an associated communications device [block 650]. If no, then the communications network determines if the calling party provides an instruction to enable the communications link with the residential network to locate an associated communications device [block 710]. If yes, then the communications network establishes the communications link according to the calling party's instructions [720]. Thereafter, the communications network determines if the profile enables other call handling options, such as, for example, sending a notification of a location of the associated communications device to a third party [block 730]. If yes, then the communications network processes the incoming communications signal according and/or the alternate communications signal associated with Emergency Locator Profile according to parameters set forth in the profile [block 740]. If the profile does not enable other call handling options, then the communications method ends. Referring back to "Block 710," if the calling party is not authorized to enable the communications link with the residential network, then the communications network determines if the profile enables other call handling options [block 730]. If yes, then the communications network processes the incoming communications signal according and/or the alternate communications signal associated with Emergency Locator Profile according to parameters set forth in the profile [block 740]. If the profile does not enable other call handling options, then the communications method ends.

Referring back to "Block 650", if the Emergency Locator Profile does automatically enable a communication link with the residential network, then the Emergency Locator Application generates the Emergency Locator Signal [block 810], and the communications network transmits the Emergency Locator Signal to a communications address of the local communications network [block 820]. Thereafter, the transmitted Emergency Locator Signal communicates with the residential network to identify a location of a selected communications device at an emergency communications address and communicates the location to the emergency response call center [block 830]. Next, the communications network determines if the profile enables other call handling options [block 840]. If yes, then the communications network processes the incoming communications signal according and/or the alternate communications signal associated with Emergency Locator Profile according to parameters set forth in the profile [block 850]. If the profile does not enable other call handling options, then the communications method ends.

As is apparent to those of ordinary skill in the art, the Emergency Locator Module 314 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Emergency Locator Module 314 to be easily disseminated. A computer program product for expanding bandwidth includes the Emergency Locator Module 314 stored on the computer-readable medium. The Emergency Locator Module 314 may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While several exemplary implementations of embodiments of this invention are described herein, various modifications and alternate embodiments will occur to those of ordinary skill in the art. For example, the next generation "softswitch" simply replaces the SCP with an "application server." This application server is a conventional computer server that also includes triggers for telecommunications services so that "new entrants" into telecommunications services (e.g., new telecommunications service providers) don't have to purchase an expensive SSP and/or SCP to process telephone calls. This next-generation packet network represents an alternative operating environment for the systems, methods, programs, and apparatuses of this invention. Here the telecommunications switch includes a packet-based "softswitch." This "softswitch" uses software control to provide voice, data, and video services by dynamically changing its connection data rates and protocols types. An application server interfaces with the "softswitch" via a packet protocol, such as Session Initiation Protocol (SIP). This application server includes voice service protocols, triggers, and operations that allow the PSTN and the data network (e.g., the world wide electronic communications network) to interoperate. Accordingly, this invention is intended to include those other variations, modifications, and alternate embodiments that adhere to the spirit and scope of this invention.

What is claimed is:

1. A system for providing emergency communication comprising:

a processor executing instructions stored in memory, the instructions causing the processor to:

receive a communication from a sender's communications address to an emergency response communications address;

associate the sender's communications address and the emergency response communications address to a profile;

retrieve an emergency address from the profile;

prompt the sender during the communication to enter a code that blocks generation of an emergency locator signal;

automatically block generation of the emergency locator signal when the code is entered; and generate the emergency locator signal when the code is not entered to identify a location of the sender's communications device.

2. The system of claim 1, wherein the instructions further cause the processor to associate the profile with an incoming line identification (ICLID) signal.

3. The system of claim 1, wherein the instructions further cause the processor to retrieve from the profile an identifier of a room within a building associated with the sender's communications address.

4. The system of claim 1, wherein the instructions further cause the processor to communicate the emergency locator signal to the sender's communications address.

5. The system of claim 1, wherein the instructions further cause the processor to retrieve a third party communications address from the profile and to communicate the emergency locator signal to the third party communications address.

6. The system of claim 5, wherein the instructions further cause the processor to:

retrieve from the profile an identifier of a room within a building associated with the sender's communications address; and send the identifier of the room to the third party communications address.

7. The system of claim 1, wherein the instructions further cause the processor to activate a continuous ringer at the sender's communications address to identify the location of the sender's communications device.

8. The system of claim 1, wherein the instructions further cause the processor to retrieve a third party communications address from the profile and to notify the third party communications address that the ringer was activated.

9. The system of claim 1, wherein the instructions further cause the processor to establish a voice communication with the sender's communications address.

10. The system of claim 9, wherein the instructions further cause the processor to:

retrieve a third party communications address from the profile; and establish a voice connection between the emergency response communications address and the third party communications address.

11. The system of claim 1, wherein the instructions further cause the processor to establish a three-way voice communication between the sender's communications address, the emergency response communications address, and the third party communications address.

12. A system for providing emergency communication comprising:

a processor executing instructions stored in memory, the instructions causing the processor to:

receive a communication from a sender's communications address to an emergency response communications address;

associate the sender's communications address and the emergency response communications address to a profile;

retrieve from the profile an emergency address and an identifier of a room within a building associated with the sender's communications address;

prompt the sender during the communication to enter a code that blocks generation of an emergency locator signal;

automatically block generation of the emergency locator signal when the code is entered;

generate the emergency locator signal when the code is not entered to comprise the identifier of the room within the building associated with the sender's communications address; and send the emergency locator signal to the an emergency address to identify a physical location of the sender's communications device.

13. The system of claim 12, wherein the instructions further cause the processor to:

retrieve a third party communications address from the profile; and establish a three-way voice communication between the sender's communications address, the emergency response communications address, and the third party communications address.

14. A method of providing emergency communication, comprising:

receiving a communication from a sender's communications address to an emergency response communications address;

associating the sender's communications address and the emergency response communications address to a profile;

retrieving an emergency address from the profile;

prompting the sender during the communication to enter a code that blocks generation of an emergency locator signal;

automatically blocking generation of the emergency locator signal when the code is entered; and generating the emergency locator signal when the code is not entered to identify a location of the sender's communications device.

15. The method of claim 14, comprising:

associating the profile with an incoming line identification (ICLID) signal.

16. The method of claim 14, further comprising retrieving from the profile an identifier of a room within a building associated with the sender's communications address.

17. The method of claim 16, further comprising:

communicating the emergency locator signal to the sender's communications address;

retrieving a third party communications address from the profile;

communicating the emergency locator signal to the third party communications address; and communicating the identifier of the room within the building associated with the sender's communications address.

18. The method of claim 16, further comprising:

activating a continuous ringer at the sender's communications address to identify the location of the sender's communications device.

19. The method of claim 18, further comprising establishing a voice communication with the sender's communications address.

20. A method of providing emergency communication, comprising:

receiving a communication from a sender's communications address to an emergency response communications address;

associating the sender's communications address and the emergency response communications address to a profile;

retrieving from the profile an emergency address and an identifier of a room within a building associated with the sender's communications address;

prompting the sender during the communication to enter a code that blocks generation of an emergency locator signal;

automatically blocking generation of the emergency locator signal when the code is entered;

generating the emergency locator signal when the code is not entered to comprise the identifier of the room within the building associated with the sender's communications address; and sending the emergency locator signal to the an emergency address to identify a physical location of the sender's communications device.

* * * * *